United States Patent
Ricaud

(10) Patent No.: US 11,479,367 B2
(45) Date of Patent: Oct. 25, 2022

(54) ASSISTANCE VEHICLE FOR ASSISTING AIRCRAFT GROUND MOVEMENTS

(71) Applicant: Airbus Operations SAS, Toulouse (FR)

(72) Inventor: Alexandre Ricaud, Aucamville (FR)

(73) Assignee: Airbus Operations SAS, Toulouse (FR)

( * ) Notice: Subject to any disclaimer, the term of this patent is extended or adjusted under 35 U.S.C. 154(b) by 381 days.

(21) Appl. No.: 16/848,020

(22) Filed: Apr. 14, 2020

(65) Prior Publication Data

US 2020/0331630 A1    Oct. 22, 2020

(30) Foreign Application Priority Data

Apr. 17, 2019  (FR) ...................................... 1904110

(51) Int. Cl.
 *B64F 1/00* (2006.01)
 *B64F 1/22* (2006.01)
 *G08G 5/06* (2006.01)

(52) U.S. Cl.
 CPC .............. *B64F 1/002* (2013.01); *B64F 1/228* (2013.01); *G08G 5/065* (2013.01)

(58) Field of Classification Search
 CPC .......... B64F 1/002; B64F 1/228; B64F 1/225; B64F 1/227; G08G 5/065; Y02T 50/80; B64C 25/405
 See application file for complete search history.

(56) References Cited

U.S. PATENT DOCUMENTS

| | | | |
|---|---|---|---|
| 9,958,867 B2 * | 5/2018 | Cox | G05D 1/0202 |
| 11,208,129 B2 * | 12/2021 | Kumar | B64C 39/024 |
| 11,284,040 B2 * | 3/2022 | Yearwood | B64C 39/024 |

(Continued)

FOREIGN PATENT DOCUMENTS

| | | | |
|---|---|---|---|
| EP | 3293072 A1 * | 3/2018 | B61C 17/06 |
| EP | 3293072 A1 | 3/2018 | |

(Continued)

OTHER PUBLICATIONS

French Search Report; priority document, dated Jan. 20, 2020.

*Primary Examiner* — Behrang Badii
*Assistant Examiner* — Jalal C Coduroglu
(74) *Attorney, Agent, or Firm* — Greer, Burns & Crain, Ltd.

(57) ABSTRACT

An assistance vehicle designed for supplying electrical energy to an electric taxiing device of an aircraft landing gear when the aircraft is moving over the ground. The assistance vehicle includes an autonomous energy source, a connector enabling it to be coupled to the aircraft and to electrically power the electric taxiing device. When an assistance instruction comprising the aircraft position is received, the assistance vehicle moves in an autonomous manner so as to reach the position of the aircraft, is automatically connected to the electric taxiing device when the assistance vehicle reaches the position of the aircraft and switches into freewheeling mode. When the assisted move has finished, the assistance vehicle is separated from the electric taxiing device and switches back into tractor mode. Thus, the electrical power supply system of the aircraft is simplified by externalizing the electrical supply of the electric taxiing device.

9 Claims, 5 Drawing Sheets

(56) References Cited

U.S. PATENT DOCUMENTS

| | | | | |
|---|---|---|---|---|
| 2011/0073706 A1* | 3/2011 | Katsumata | ................ | B64F 1/22 |
| | | | | 244/50 |
| 2011/0127366 A1* | 6/2011 | Becker | .................... | B64F 1/228 |
| | | | | 244/50 |
| 2012/0061521 A1* | 3/2012 | Perry | ...................... | B64F 1/227 |
| | | | | 244/175 |
| 2012/0119018 A1* | 5/2012 | Perry | ...................... | B64F 1/228 |
| | | | | 244/50 |
| 2015/0142214 A1* | 5/2015 | Cox | ...................... | B64C 25/405 |
| | | | | 701/3 |
| 2017/0057663 A1* | 3/2017 | Alonso Tabares | ...... | B64F 1/228 |
| 2018/0086455 A1* | 3/2018 | Burch, V | ................ | H04W 4/48 |
| 2018/0134413 A1* | 5/2018 | Halsey | .................... | B64F 1/364 |
| 2019/0176862 A1* | 6/2019 | Kumar | .................. | B64D 47/08 |

FOREIGN PATENT DOCUMENTS

| | | | | | |
|---|---|---|---|---|---|
| EP | | 3418969 A1 | * 12/2018 | .............. | B64F 1/002 |
| FR | | 2675919 A1 | * 10/1992 | ................ | B64F 1/22 |
| FR | | 2675919 A1 | 10/1992 | | |
| FR | | 3040372 A1 | * 3/2017 | .......... | B60L 11/1809 |
| FR | | 3040372 A1 | 3/2017 | | |
| WO | | 2013042114 A1 | 3/2013 | | |
| WO | WO-2013042114 A1 | | * 3/2013 | .............. | B64F 1/227 |
| WO | WO-2016174466 A2 | | * 11/2016 | ............ | B25J 11/002 |
| WO | | 2018206983 A1 | 11/2018 | | |
| WO | WO-2018206983 A1 | | * 11/2018 | ........... | B64C 39/022 |

\* cited by examiner

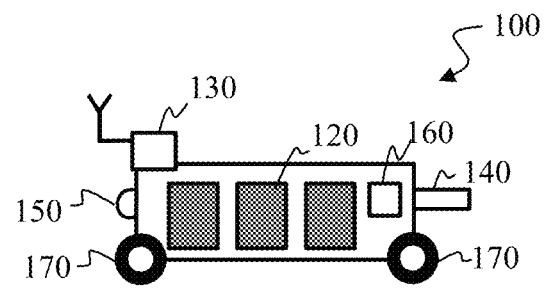
Fig. 1
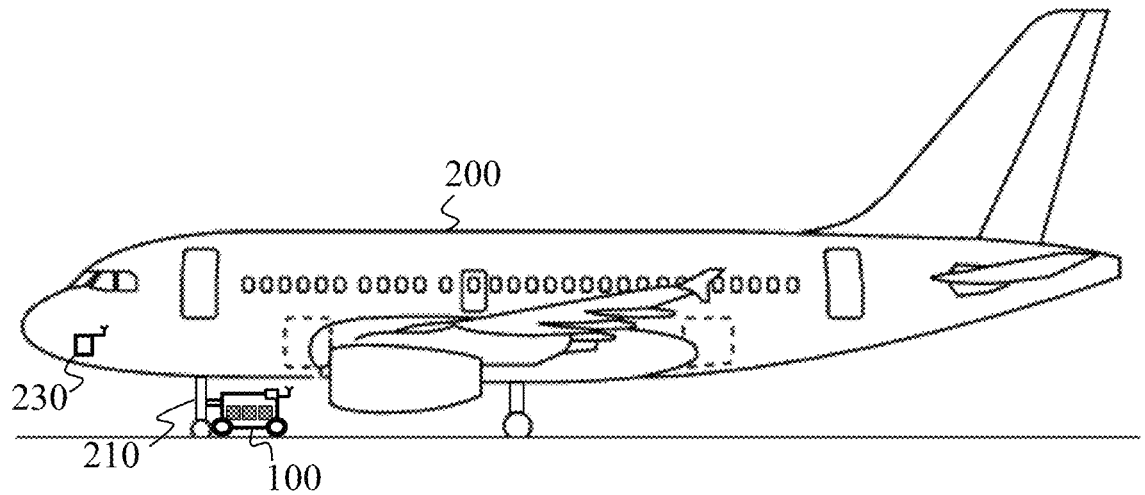
Fig. 2A
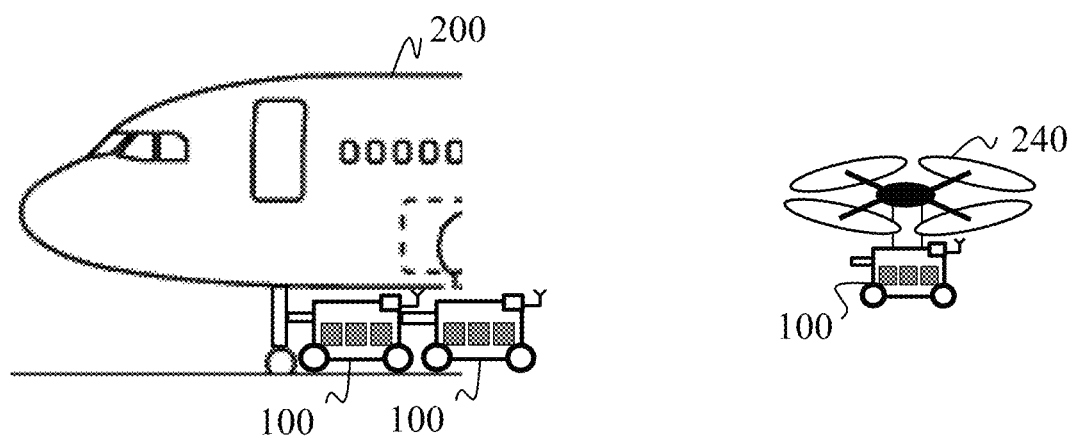
Fig. 2B
Fig. 2C

ASSISTANCE VEHICLE FOR ASSISTING AIRCRAFT GROUND MOVEMENTS

CROSS-REFERENCES TO RELATED APPLICATIONS

This application claims the benefit of the French patent application No. 1904110 filed on Apr. 17, 2019, the entire disclosures of which are incorporated herein by way of reference.

FIELD OF THE INVENTION

The present invention relates to the field of assistance for aircraft ground movements during taxiing phases. The present invention relates more precisely to the field of electrical supply of electric aircraft taxiing devices.

BACKGROUND OF THE INVENTION

Taxiing is the phase during which an aircraft moves over the ground prior to take-off or after landing, for example between a parking place and a runway. Generally, the ground movements of an aircraft in the taxiing phase are carried out using the propulsion engines of the aircraft. This mode of travel consumes fuel and leads to a non-negligible emission of greenhouse gases with respect to the total emission from flights. In particular, the emission of CO2 by aircraft in the taxiing phase represents 43 million tons of CO2 per year, namely 6% of the total emission of CO2 from aviation. Moreover, the consumption of fuel in the taxiing phase is costly and increases in the case of traffic congestion and delays. During traffic congestion, excessive consumption of fuel may even lead to planes having to refuel, which results in flight delays or cancellations. The maneuvering of an aircraft on the ground with the aid of its propulsion engines furthermore generates noise pollution, whereas noise restrictions in airports are becoming stricter.

In certain cases, the ground movement phases are provided by tractors responsible for towing the aircraft over a taxiing distance to be covered. However, this solution presents other drawbacks. On the one hand, the tractors must be sufficiently powerful to be able to move aircraft and are generally bulky. The movements of the tractors within the airport thus generate additional constraints for management of the traffic linked to congestion of the roadways by the tractors. On the other hand, the traction system involves additional mechanical stresses on the landing gear to which the tractors are attached.

Electric taxiing devices have also been developed in order to enable ground movement of aircraft without using the engines of these aircraft. The electric taxiing devices, sometimes called EGTS (Electric Green Taxiing System) or eTaxi in the literature, are electrically powered through the use of auxiliary power generators or APUs (Auxiliary Power Unit) of the aircraft, which themselves consume fuel. Moreover, electrically connecting such electric taxiing devices to their auxiliary power generators APU requires a long length of electrical cables, because the auxiliary power generators APU are typically installed at the back of aircraft.

It is desirable to provide a solution that enables overcoming these drawbacks of the prior art. It is notably desirable to provide a solution that enables aircraft to carry out ground maneuvers while reducing their fuel consumption and decreasing the emissions of greenhouse gases.

It is additionally desirable to provide a solution that enables reduction of the electrical cabling used for supplying, in an aircraft, an electric taxiing device that enables the aircraft to be moved over the ground without having to make use of a tractor or of the propulsion engines of the aircraft.

SUMMARY OF THE INVENTION

The invention relates to an assistance vehicle designed for supplying electrical energy to an electric taxiing device situated on a landing gear of an aircraft while the aircraft is moving over the ground, the assistance vehicle comprises an autonomous source of energy, a connector enabling it to be mechanically and electrically connected to the electric taxiing device so as to be coupled to the aircraft and to electrically power the electric taxiing device by virtue of the autonomous source of energy, a first wireless communications interface, and a control mechanism. When an assistance instruction comprising the position of the aircraft is received via the first wireless communications interface, the control mechanism implements means of autonomous navigation so as to reach the position of the aircraft, and a collision-avoidance detector for detecting and getting around unexpected obstacles during move of the assistance vehicle. When the assistance vehicle reaches the position of the aircraft, the control mechanism implements means for automatically connecting the connector to the electric taxiing device and means for switching into a freewheeling mode in order to be towed by the aircraft, and means for transmitting, via the first wireless communications interface, a confirmation of transfer in order to indicate that the aircraft can move over the ground with the electric taxiing device powered by the assistance vehicle. When a disconnection instruction is received via the first wireless communications interface, the control mechanism implements means for disconnecting the connector in order to separate it from the electric taxiing device and means for switching back into a tractor mode. Thus, by externalizing the electrical supply of the electric taxiing device by virtue of the assistance vehicle, the electrical cabling used for electrically powering the electric taxiing device is reduced. This simplifies its design, installation and maintenance.

According to one particular embodiment, the assistance vehicle further comprises an electrical connection device designed to be connected to the connector of another assistance vehicle so as to couple to the aircraft at least two assistance vehicles connected in series.

The invention also relates to a transfer system which comprises the assistance vehicle and which further comprises a drone attachable to the assistance vehicle enabling the assistance vehicle to be transported by air.

The invention also relates to an aircraft equipped with an electric taxiing device on a landing gear. The aircraft further comprises a connection device, situated on the landing gear or on the electric taxiing device and designed to connect the assistance vehicle through the use of the connector of the assistance vehicle in order to electrically power the electric taxiing device.

The invention also relates to an assistance system designed to meet a need for supplying electrical energy to an electric taxiing device equipping a landing gear of an aircraft while the aircraft is moving over the ground. The assistance system comprises at least one assistance vehicle and one assistance station equipped with a second wireless communications interface. When a request for moving an aircraft comprising the position of the aircraft is received coming from a terminal assumed to be on board the aircraft via the second wireless communications interface, the assistance station implements means for identifying at least one available assistance vehicle, and means for transmitting to at least one available assistance vehicle an assistance instruction comprising the position of the aircraft. When a transfer confirmation coming from each assistance vehicle concerned is received via the second wireless communications interface, the assistance station implements means for transmitting a move authorization to the terminal, and when a move confirmation is received coming from the terminal via the second wireless communications interface, the assistance station implements means for transmitting a disconnection instruction to each assistance vehicle concerned.

According to one particular embodiment, the system further comprises a computer program product designed to be installed on the terminal and comprising instructions causing the implementation by a processor of the terminal of the following steps:

upon detection of an order for assisted moving of the aircraft via a user interface of the terminal, transmit the moving request to the assistance station which comprises global positioning information for the terminal;

receive a move authorization coming from the assistance station and indicate via the user interface that the assisted move of the aircraft is ready; and upon detection of an indication of the end of assisted moving of the aircraft via the user interface of the terminal, transmit the move confirmation to the assistance station.

The invention also relates to an airport equipped with the assistance system.

The invention also relates to an assistance method implemented by an assistance vehicle for supplying electrical energy to an electric taxiing device situated on a landing gear of an aircraft while the aircraft is moving over the ground. The assistance vehicle comprises an autonomous source of energy, a connector enabling it to be mechanically and electrically connected to the electric taxiing device so as to be coupled to the aircraft and to electrically power, by virtue of the autonomous source of energy, the electric taxiing device, a first wireless communications interface, and a control mechanism. When an assistance instruction comprising the position of the aircraft is received via the first wireless communications interface, the control mechanism performs the following steps:

implement an autonomous navigation so as to reach the position of the aircraft, through the use of a collision-avoidance detector, detect and get around unexpected obstacles in the path of the assistance vehicle, when the assistance vehicle reaches the position of the aircraft, automatically connect the connector to the electric taxiing device and switch into a freewheeling mode in order to be towed by the aircraft, then transmit, via the first wireless communications interface, a transfer confirmation in order to indicate that the aircraft can move over the ground with the electric taxiing device powered by the assistance vehicle, when a disconnection instruction is received via the first wireless communications interface, disconnect the connector in order to separate it from the electric taxiing device and switch back into tractor mode.

The invention also relates to a management method implemented by an assistance system in order to meet a need for supplying an electric taxiing device of an aircraft with electrical energy while the aircraft is moving over the ground. The assistance system comprises at least one assistance vehicle which implements the assistance method, and an assistance station equipped with a second wireless communications interface. The assistance station performs the following steps:

when a move request coming from a terminal assumed to be on board the aircraft and comprising the position of the aircraft is received via the second wireless communications interface: identifying at least one available assistance vehicle, and transmitting to at least one assistance vehicle an assistance instruction comprising the position of the aircraft;

when a transfer confirmation coming from each concerned assistance vehicle is received via the second wireless communications interface: transmitting a move authorization to the aircraft; and when a move confirmation coming from the terminal is received via the second wireless communications interface: transmitting a disconnection instruction to each concerned assistance vehicle.

BRIEF DESCRIPTION OF THE DRAWINGS

The aforementioned features of the invention, together with others, will become more clearly apparent upon reading the following description of at least one exemplary embodiment, the description being presented in relation with the appended drawings, among which:

FIG. 1 illustrates schematically an assistance vehicle designed to assist the ground movement of an aircraft;

FIG. 2A illustrates schematically a coupling of the assistance vehicle and of an aircraft, according to a first embodiment;

FIG. 2B illustrates schematically the coupling of the assistance vehicle and of an aircraft, according to a second embodiment;

FIG. 2C illustrates schematically the assistance vehicle coupled to a drone;

DETAILED DESCRIPTION OF THE PREFERRED EMBODIMENTS

Figure 3:
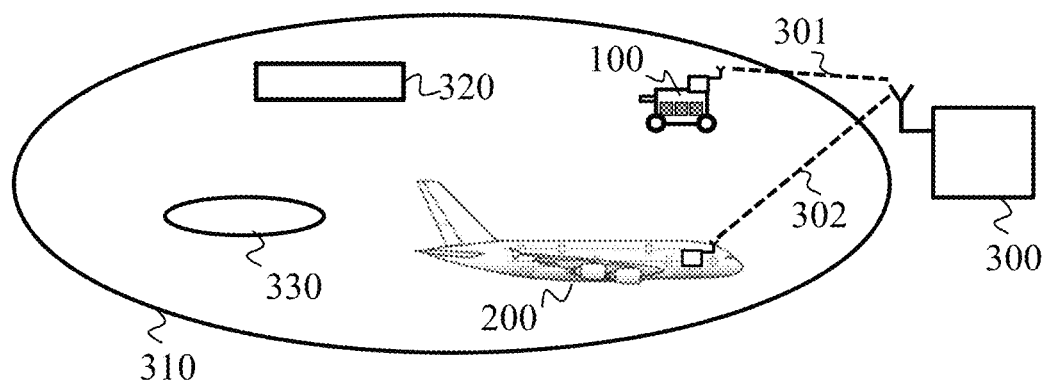
FIG. 3 illustrates schematically an assistance system designed to assist the move of at least one aircraft and comprising at least one assistance vehicle and an assistance station.

FIG. 1 shows schematically, as a side view, an assistance vehicle 100 designed to supply electrical power to an electric taxiing device of an aircraft 200, in order to assist the ground movement of the aircraft 200.

The assistance vehicle 100 comprises at least one autonomous source of energy 120, such as a battery or a fuel cell, designed to power the electric taxiing device. In the following, it is considered that the autonomous source of energy 120 is one or more batteries.

The assistance vehicle 100 further comprises a mechanical and electrical connector 140 enabling a mechanical link to be provided, together with an electrical connection with a landing gear 210 of the aircraft 200.

In one particular embodiment, the assistance vehicle 100 comprises an electrical connection device designed to electrically connect the assistance vehicle 100 to a recharging station 320, for example at a departure gate, in order to recharge the battery or batteries 120. The electrical connection device used for recharging the battery or batteries 120 may be the same as that used for electrically connecting the assistance vehicle 100 to the aircraft 200. In one variant embodiment, the assistance vehicle 100 comprises a photovoltaic panel enabling the battery or batteries 120 to be recharged.

In one particular embodiment, the assistance vehicle 100 comprises an electrical connection device 150 which enables at least two assistance vehicles 100 to be connected in series as shown in FIG. 2B. A first assistance vehicle 100 is coupled via its connector 140 to an aircraft 200, on the one hand. On the other hand, the electrical connection device 150 of the first assistance vehicle 100 is mechanically and electrically connected to the connector 140 of a second assistance vehicle 100. It is thus possible to adapt the quantity of electrical energy supplied to an aircraft 200 according to the needs of the aircraft 200.

The assistance vehicle 100 further comprises an electric motor 160 driving wheels 170, or caterpillar tracks, which enable the assistance vehicle 100 to move. The electric motor 160 is powered by the battery or batteries 120.

The assistance vehicle 100 comprises, integrated into or connected to a control mechanism 130, a wireless communications interface enabling it to communicate with an assistance station 300 in order to exchange information and to receive intervention instructions. The intervention instructions comprise a destination and a type of intervention to be carried out at the destination location. For example, the assistance vehicle 100 may receive instructions ASSIST_INST for providing assistance to an aircraft 200 which comprise the position of the aircraft 200 and a request for assistance in moving the aircraft 200. Optionally, the assistance instructions further comprise a nominal itinerary which indicates a path to be followed in order to reach the destination. The nominal itinerary may, however, be adapted by the assistance vehicle 100 in order to avoid unexpected obstacles situated on the nominal itinerary. As a variant, the control mechanism 130 may itself calculate the nominal itinerary, in view of its global positioning upon receipt of the assistance instructions and of the destination location.

The assistance vehicle 100 comprises an autonomous navigation system, integrated into the control mechanism 130, enabling it to control the electric motor 160 and the direction of the assistance vehicle 100, so as to enable the assistance vehicle 100 to drive itself in an autonomous manner (without a driver) and to automatically follow a predetermined path while avoiding obstacles. The autonomous navigation system of the control mechanism 130 converts the itinerary received or calculated by the assistance vehicle 100 into navigation commands and executes the navigation commands.

The assistance vehicle 100 is equipped with a global positioning device, for example of the GPS (Global Positioning System) type, which enables information on absolute global positioning of the assistance vehicle 100 to be obtained and its current position to be known. The global positioning enables, in the framework of the autonomous navigation system, the closed-loop control of the navigation commands on the nominal itinerary. As a variant, relative global positioning modules may be used to know the relative position of the assistance vehicle 100 with respect to a fixed reference, of known position, by using an RTK (Real Time Kinematic) approach. The position of the assistance vehicle 100 may thus be obtained with a precision of the order of a few centimeters. In one particular embodiment, the assistance vehicle 100 periodically communicates its global positioning to the assistance station 300. As a variant, the assistance station 300 may obtain, on demand, the global positioning of the assistance vehicle 100.

The control mechanism 130 is further equipped with a collision-avoidance detector CAD 407. The collision-avoidance detector may comprise sensors designed to detect unexpected obstacles while moving and to enable an avoidance procedure to be triggered. For example, the assistance vehicle 100 is equipped with sonar detectors on the sides and at the rear of the vehicle, and is equipped, at the front, with LiDAR (Light Detection And Ranging) laser detectors enabling an obstacle to be detected and its distance to be evaluated by analysis of properties of a beam of light. When the assistance vehicle 100 thus detects, by virtue of these sensors, the presence of an obstacle at a distance less than a predefined threshold, the avoidance procedure is triggered. The path of the assistance vehicle 100 is then modified in order to get around the obstacle and the autonomous navigation system adapts the navigation commands taking into account the modified path. Thus, the assistance vehicle 100 can quickly and easily reach a destination despite the presence of obstacles on its route.

In one particular embodiment, the assistance vehicle 100 is equipped with at least one on-board camera. Thus, the assistance vehicle 100 can detect and recognize orientation and positioning references within its environment enabling it to move, orient itself or position itself. For example, the assistance vehicle 100 may align itself onto a dedicated road within an airport identified by specific markings, which prevents it straying from an authorized area. The control mechanism 130 may also position the assistance vehicle 100 with respect to an aircraft 200 with the aid of the on-board camera in order to automatically couple itself to the aircraft 200 through the use of the connector 140. The detection of obstacles by the assistance vehicle 100 may also make use of the on-board camera.

In one particular embodiment, the assistance vehicle 100 is equipped with light projection systems, such as headlamps, so as to illuminate a part of the environment of the assistance vehicle 100. It is thus possible to carry out an acquisition of images by an on-board camera when the external lighting is not sufficient. A light-level sensor, for example optical, may also be used for activating the light projection system only below a predefined light level threshold.

FIG. 2A shows schematically, as a side view, a coupling of the assistance vehicle 100 and of an aircraft 200. The assistance vehicle 100 is coupled, through the use of the connector 140, to a landing gear fitted with an electric taxiing device, typically on the front landing gear 210 of the aircraft 200. The aircraft 200 is equipped with a connection device, situated on the landing gear 210 or on the electric taxiing device and adapted for connecting the connector 140 of the assistance vehicle 100, in order to electrically power the electric taxiing device of the aircraft 200.

The electric taxiing device is an electrical device for driving the landing gear wheels which enables the aircraft 200 to move over the ground without having to make use of a tractor or of the engines of the aircraft 200.

The assistance vehicle 100 may further electrically power one or more other electrical devices of the aircraft 200, such as the cabin lighting.

When the aircraft 200 is moving over the ground, the assistance vehicle 100 connected to the aircraft 200 is in a freewheeling mode. In other words, the assistance vehicle 100 follows the aircraft 200 at the speed of the aircraft 200 and does not provide any mechanical drive power to the aircraft 200. Thus, the mechanical stresses on the connector 140 are limited.

The assistance vehicle 100, connected to the aircraft 200 while parked, for example at a departure gate, is preferably connected to the recharging station 320 in order to be recharged.

The aircraft 200 is fitted with a terminal 230 equipped with a wireless communications interface enabling information to be exchanged with the assistance station 300. The terminal 230 may be integrated into the cockpit of the aircraft 200 or be carried on board by a pilot of the aircraft 200. Thus, a move request MOV_RQ may be sent by this terminal 230 from the aircraft 200, in order to obtain an electrical assistance to perform a movement over the ground. The terminal 230 is further equipped with a global positioning device in order to know and to communicate the global positioning of the aircraft 200.

FIG. 2C shows the assistance vehicle 100 being moved, according to one particular embodiment, through the use of a drone 240. The assistance vehicle 100 is attached to the drone 240 which can then transport the assistance vehicle 100 by air. Thus, the assistance vehicle 100 does not congest the airport ground roadways when it is being moved.

The drone 240 may be attached to the assistance vehicle 100 in a permanent manner.

In one particular embodiment, upon receipt of a command for aerial transport comprising the position of the assistance vehicle 100, the drone 240 is automatically attached to the assistance vehicle 100. The aerial transport command may further comprise the position of an aircraft 200 in order for the drone 240 to transport the assistance vehicle 100 as far as the position of the aircraft 200.

In one particular embodiment, the drone 240 is equipped with a device for global positioning in space enabling it to know its altitude. As a variant, the assistance vehicle 100 is itself equipped with a device for global positioning in space and communicates its position to the drone 240.

FIG. 3 shows an assistance system designed to supply electrical power to an electric taxiing device of an aircraft 200 within the limits of an area of land 310. The land area 310 is all or part of an airport. The assistance system is thus able to assist the ground movement of one or more aircraft. The assistance system comprises at least one assistance vehicle 100, the assistance station 300 and preferably the recharging station 320 (or several recharging stations).

The recharging station 320 enables the battery or batteries 120 of each assistance vehicle 100 to be recharged. The recharging station 320 is equipped with generators which are preferably supplied by renewable energy sources: the recharging station 320 comprises, for example, solar panels, a wind turbine or hydrogen generators. Each assistance vehicle 100 connects to the recharging station 320 automatically.

The assistance station 300 enables the movements of each assistance vehicle 100 within the land area 310 to be managed. For this purpose, the assistance station 300 is equipped with a wireless communications interface enabling it to communicate with one or more aircraft 200 via at least one wireless link 302, on the one hand, and to communicate with at least one assistance vehicle 100 via at least one wireless link 301, on the other. The wireless links 301 and 302 are, for example, of the Wi-Fi type. Relays may be disposed over the land area 310, in order to enable wireless links 301 and 302 to be provided at any point of the land area 310. One example of exchange of messages is detailed hereinafter in relation with FIG. 8.

The assistance station 300 keeps information representative of the availability of each assistance vehicle 100 updated, which enables it to be identified whether the assistance vehicle 100 is ready to take the job. The information representative of the availability of an assistance vehicle 100 may take into account, for example, an assistance intervention programmed or underway, the level of charge of the battery or batteries 120 of the assistance vehicle 100, or else an electrical recharging in progress.

Figure 8:
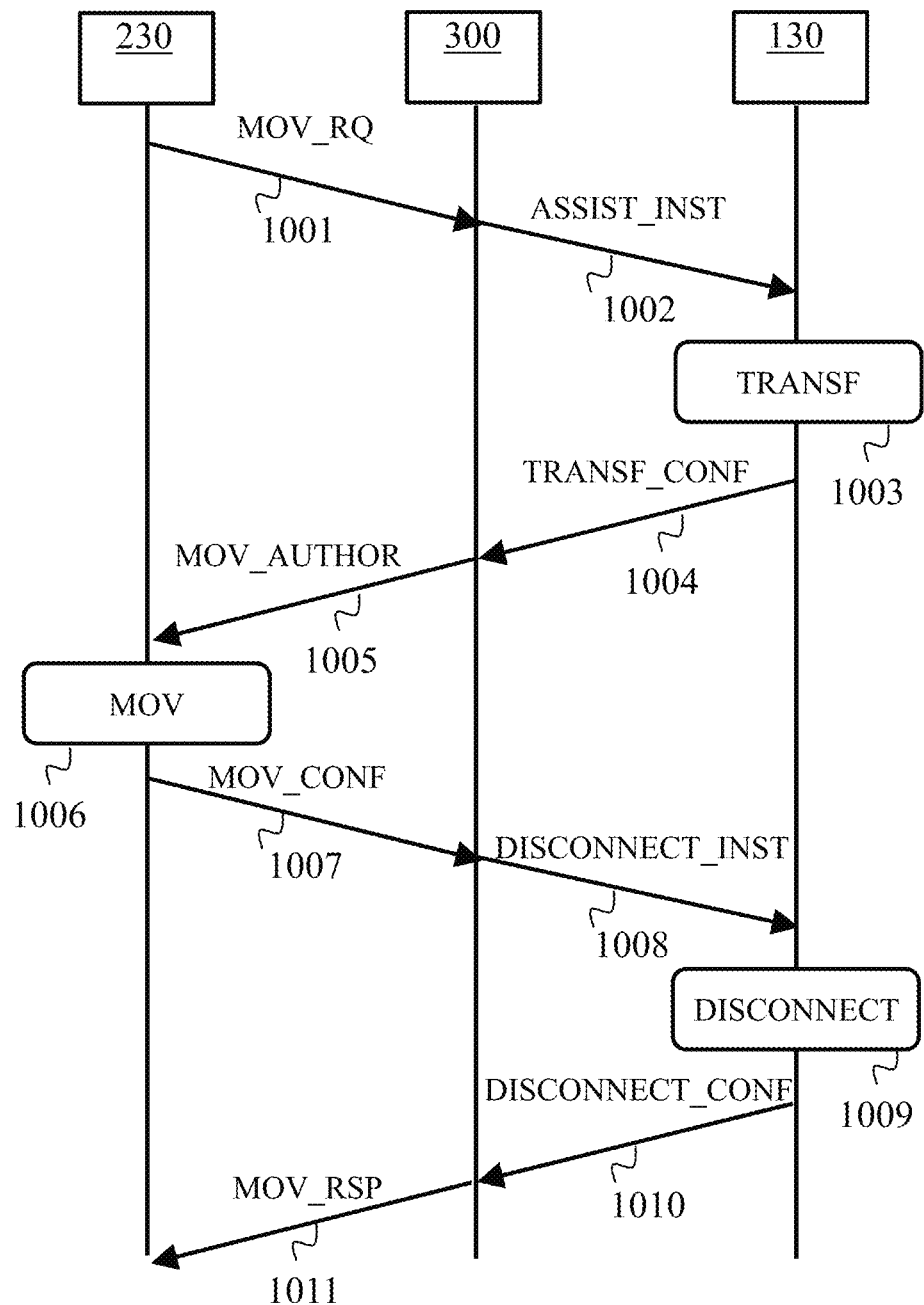
FIG. 8 illustrates schematically exchanges of messages within the assistance system, in the framework of an intervention for assistance in moving an aircraft.

FIG. 8 illustrates schematically an algorithm for implementation of an intervention to assist in moving the aircraft 200.

In a step 1001, the terminal 230 of the aircraft 200 transmits a move request MOV_RQ to the assistance station 300 via the wireless link 302. For example, the aircraft 200 is parked at a boarding gate and it needs to be moved to a runway for take-off. The move request MOV_RQ comprises information indicating the current position of the aircraft 200; the position may be obtained by obtaining global positioning information from the terminal 230. The terminal 230 knows that the aircraft 200 is to be moved by detecting an order for an assisted move of the aircraft 200, for example by an action on a dedicated button (in other words, the pilot of the aircraft 200 orders the assisted move by interacting with a user interface of the terminal 230).

In a step 1002, the assistance station 300 identifies an available assistance vehicle 100 and transmits an assistance instruction ASSIST_INST to the control mechanism 130 of the assistance vehicle 100 via the wireless link 301. The assistance instruction ASSIST_INST indicates, to the identified assistance vehicle 100, the position of the aircraft 200 and that intervention for assistance is to be carried out on the aircraft 200.

In a step 1003, the assistance vehicle 100 carries out a transfer TRANSF by moving to the position of the aircraft 200, coupling itself mechanically and electrically to the aircraft 200 and switching into freewheeling mode. The assistance vehicle 100 subsequently transmits, in a step 1004, a transfer confirmation TRANSF_CONF to the assistance station 300 indicating that the assistance vehicle 100 is coupled to the aircraft 200.

In a step 1005, upon receipt of the transfer confirmation TRANSF_CONF, the assistance station 300 transmits a move authorization MOV_AUTHOR to the aircraft 200 indicating to the terminal 230 that the assistance vehicle 100 is ready to assist its move. The terminal 230 indicates, via its user interface, that the assisted move of the aircraft 200 is ready. Then, in a step 1006, the pilot moves the aircraft 200 by virtue of the electric taxiing device thus powered by the assistance vehicle 100.

In a step 1007, when the aircraft 200 has finished being moved, for example when the aircraft 200 has reached the runway for take-off, the terminal 230 transmits a message confirming the move MOV_CONF to the assistance station 300. The terminal 230 knows that the aircraft 200 has finished being moved by detecting an indication of an end of the assisted move of the aircraft 200, for example by an action on a dedicated button (in other words, the pilot of the aircraft 200 indicates the end of the assisted move by interacting with the user interface of the terminal 230).

In a step 1008, the assistance station 300 transmits a disconnection instruction DISCONNECT_INST to the assistance vehicle 100, requesting the assistance vehicle 100 to disconnect itself from the aircraft 200. In a step 1009, the assistance vehicle 100 is mechanically and electrically disconnected from the aircraft 200. The assistance vehicle 100 then switches back into tractor mode and into autonomous navigation.

In a step 1010, when the assistance vehicle 100 is disconnected from the aircraft 200, the assistance vehicle 100 transmits a disconnection confirmation DISCONNECT_CONF to the assistance station 300.

In a step 1011, the assistance station 300 then transmits, to the aircraft 200, a response MOV_RSP to the move request MOV_RQ confirming that the assistance intervention has finished.

Figure 4:
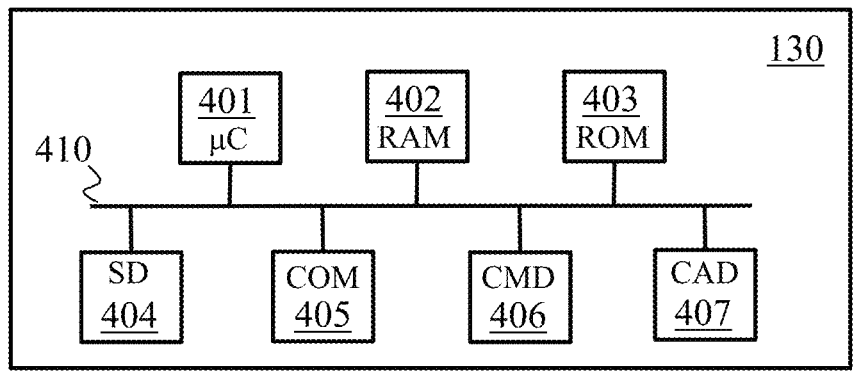
FIG. 4 illustrates schematically one example of hardware architecture of a mechanism for controlling the assistance vehicle.

FIG. 4 illustrates schematically one example of hardware architecture of the control mechanism 130.

The control mechanism 130 then comprises, connected together via a communications bus 410: a microcontroller µC 401; a volatile memory RAM (Random Access Memory) 402; a non-volatile memory ROM (Read Only Memory) 403; a storage unit 404 or a storage medium reader, such as an SD (Secure Digital) card reader; an interface COM 405 enabling communications with the assistance station 300; a control system CMD 406 for the assistance vehicle 100; and the collision avoidance detector CAD 407.

The control system CMD 406 is of the electronic circuit and/or electromechanical type enabling the assistance vehicle 100 to be steered during its move over the ground 310, and also potentially enabling it to apply complementary commands, notably turn on/off the aforementioned light projection systems and/or turn on/off the acquisition of images by the on-board camera.

The collision avoidance detector CAD 407 is a set of sensors used for detecting unexpected obstacles when the assistance vehicle 100 in question is moving over the ground 310 and thus enabling the avoidance procedure to be triggered as needed.

The microcontroller µC 401 is capable of executing instructions loaded into the RAM 402 from the ROM 403, from an external memory (such as an SD card), from a storage medium, or from a communications network. When the control mechanism 130 is powered up, the microcontroller µC 401 is capable of reading instructions from the RAM 402 and of executing them. These instructions form a computer program causing the implementation, by the microcontroller µC 401, of all or part of the algorithms and steps described here in relation to the assistance vehicle 100. All or part of the algorithms and steps may thus be implemented in the form of software by execution of a set of instructions by a programmable machine, such as a DSP (Digital Signal Processor) or a microcontroller, or be implemented in hardware form by a machine or a dedicated component, such as an FPGA (Field-Programmable Gate Array) or an ASIC (Application-Specific Integrated Circuit). The control mechanism 130 is thus an electronic circuit designed and configured for implementing all or part of the algorithms and steps described here in relation to the assistance vehicle 100.

Figure 5:
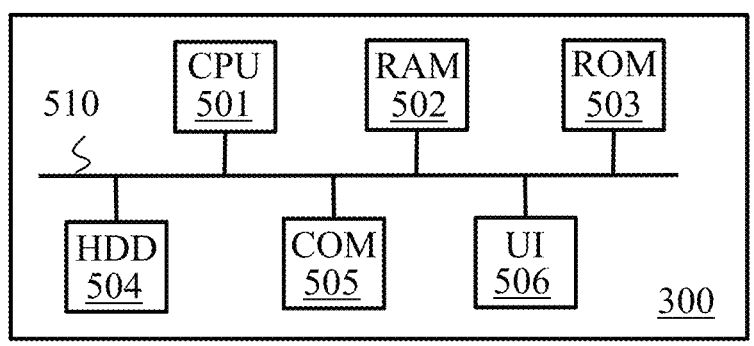
FIG. 5 illustrates schematically one example of a hardware architecture of a mechanism for controlling the assistance station.

FIG. 5 illustrates schematically one example of a hardware architecture of the assistance station 300.

The assistance station 300 thus comprises, connected together via a communications bus 510: a processor or CPU (Central Processing Unit) 501; a volatile memory RAM 502; a non-volatile memory ROM 503; a storage unit 504 or a storage medium reader, such as a hard disk HDD (Hard Disk Drive); a wireless communications interface COM 505 enabling communication, on the one hand, with each aircraft 200 and, on the other hand, with each assistance vehicle 100; and a user interface UI (User Interface) 506 enabling the assistance station 300 to interact with a user, notably for configuring the assistance system (defining a reference map representative of the geometry of the land area 310, defining areas to be avoided 330 on the land area 310, etc.).

The processor 501 is capable of executing instructions loaded into the RAM 502 from the ROM 503, from an external memory, from a storage medium, or from a communications network. When the assistance station 300 is powered up, the processor 501 is capable of reading instructions from the RAM 502 and of executing them. These instructions form a computer program causing the implementation, by the processor 501, of all or part of the algorithms and steps described here in relation to the assistance station 300.

All or part of the algorithms and steps described hereinafter in relation to the assistance station 300 may thus be implemented in the form of software by execution of a set of instructions by a programmable machine, such as a DSP or a processor, or be implemented in the form of hardware by a machine or a dedicated component, such as an FPGA or an ASIC.

Figure 6:
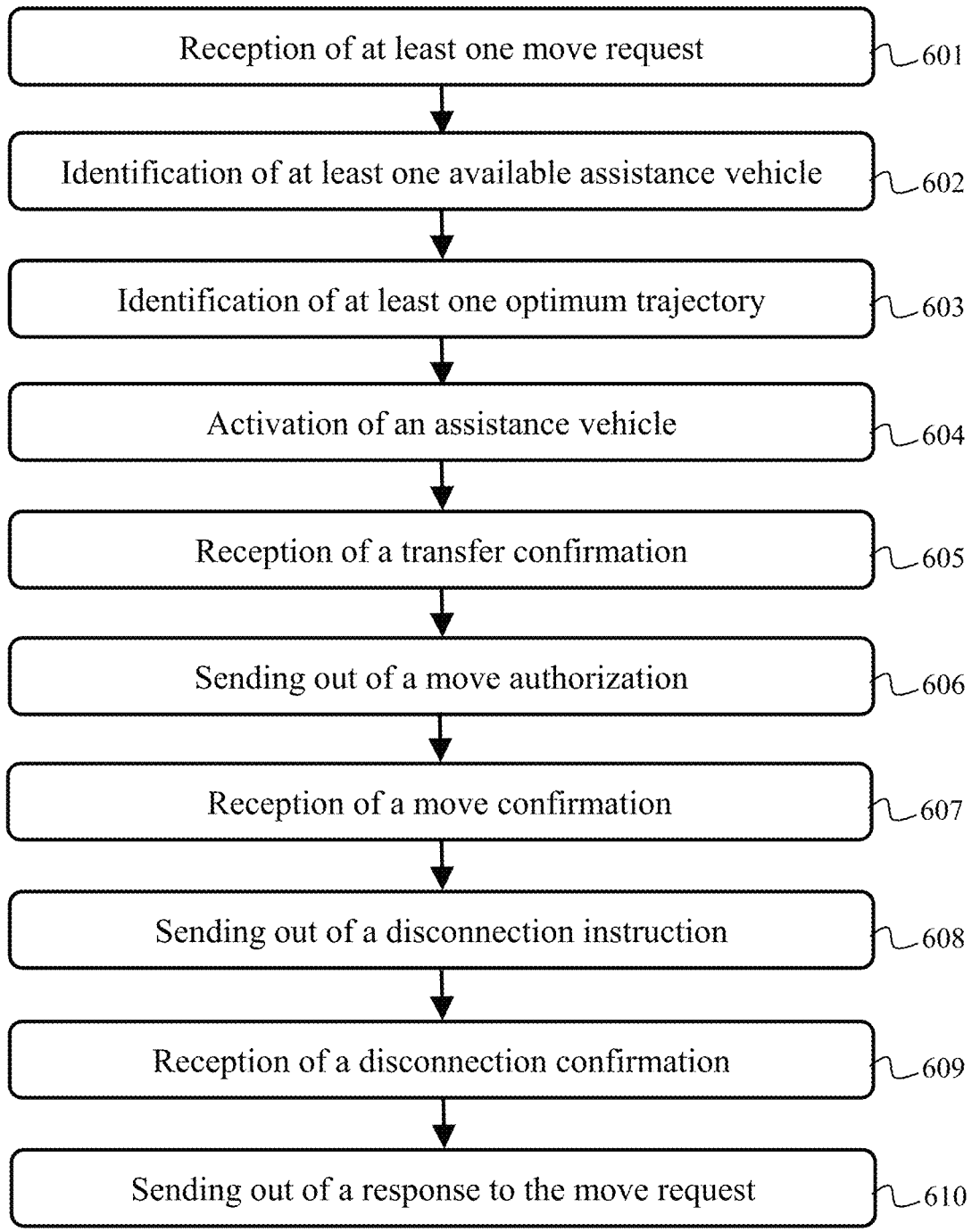
FIG. 6 illustrates schematically an algorithm, implemented by the assistance station, for assisting ground movement of at least one aircraft, according to one particular embodiment of the invention.

FIG. 6 illustrates schematically an algorithm, implemented by the assistance station 300, for assisting the ground movement of at least one aircraft 200.

During a preliminary initialization step (not shown in FIG. 6), the assistance station 300 obtains a reference map representative of the geometry of the land area. The assistance station 300 may supply, via its user interface UI 506, the means for a user to define the reference map, to input global positioning information on significant landmarks into the reference map, to define areas 330 to be avoided by each assistance vehicle 100. All or part of the reference map may also be supplied by the user through the use of a file made accessible to the assistance station 300 via a storage medium, or an external memory, or a communications network.

Each assistance vehicle 100 has a copy of the reference map, in order to enable each assistance vehicle 100 to move autonomously over the land area 310. The reference map is transmitted by the assistance station 300 to each assistance vehicle 100. As a variant, the reference map is supplied to each assistance vehicle 100 by the user by virtue of a file made accessible to the assistance vehicle 100 via a storage medium, or an external memory, or a communications network.

In a step 601, the assistance station 300 receives a move request MOV_RQ coming from an aircraft 200, together with the position of the aircraft 200.

In a step 602, the assistance station 300 identifies each available assistance vehicle 100. The assistance station 300 identifies, for each available assistance vehicle 100, the position of the assistance vehicle 100 by obtaining the corresponding information on global positioning.

In a step 603, the assistance station 300 determines at least one path between at least one available assistance vehicle 100 and the position of the aircraft 200 having sent the move request MOV_RQ. In one particular embodiment, the assistance station 300 identifies, for each available assistance vehicle 100, at least one path enabling it to get to the position of the aircraft 200 in question. The assistance station 300 subsequently selects an optimum path and identifies the assistance vehicle 100 concerned by the optimum path. In the case where several assistance vehicles 100 are required to respond to a single move request MOV_RQ from the aircraft 200, for example in order to be coupled in series to the aircraft 200, the assistance station 300 does the same for each assistance vehicle 100 required. As a variant embodiment, each assistance vehicle 100 itself determines the path to be taken in order to reach the required destination location.

In a step 604, the assistance station 300 activates each assistance vehicle 100 concerned by transmitting via the wireless link 301 an assistance instruction ASSIST_INST comprising, as a destination, the position of the aircraft 200 having sent the move request MOV_RQ. Each assistance vehicle 100 concerned is then considered as unavailable by the assistance station 300.

In a step 605, when each assistance vehicle 100 concerned has reached the destination indicated and is coupled to the aircraft 200 in question (potentially in series), the assistance station 300 receives a transfer confirmation TRANSF_CONF coming from the assistance vehicle 100.

In a step 606, the assistance station 300 sends a move authorization MOV_AUTHOR to the aircraft 200.

In a step 607, when the aircraft 200 has finished being moved, the assistance station 300 receives a corresponding move confirmation MOV_CONF.

In a step 608, the assistance station 300 sends to each assistance vehicle 100 concerned a disconnection instruction DISCONNECT_INST indicating that the move has finished and that the assistance vehicle 100 must disconnect itself from the aircraft 200.

In a step 609, the assistance station 300 receives a confirmation of disconnection DISCONNECT_CONF coming from each assistance vehicle 100 concerned and considers that the corresponding assistance vehicle 100 is again available.

In a step 610, the assistance station 300 transmits, to the aircraft 200, a response MOV_RSP to the move request MOV_RQ confirming that the assistance intervention is finished.

Figure 7:
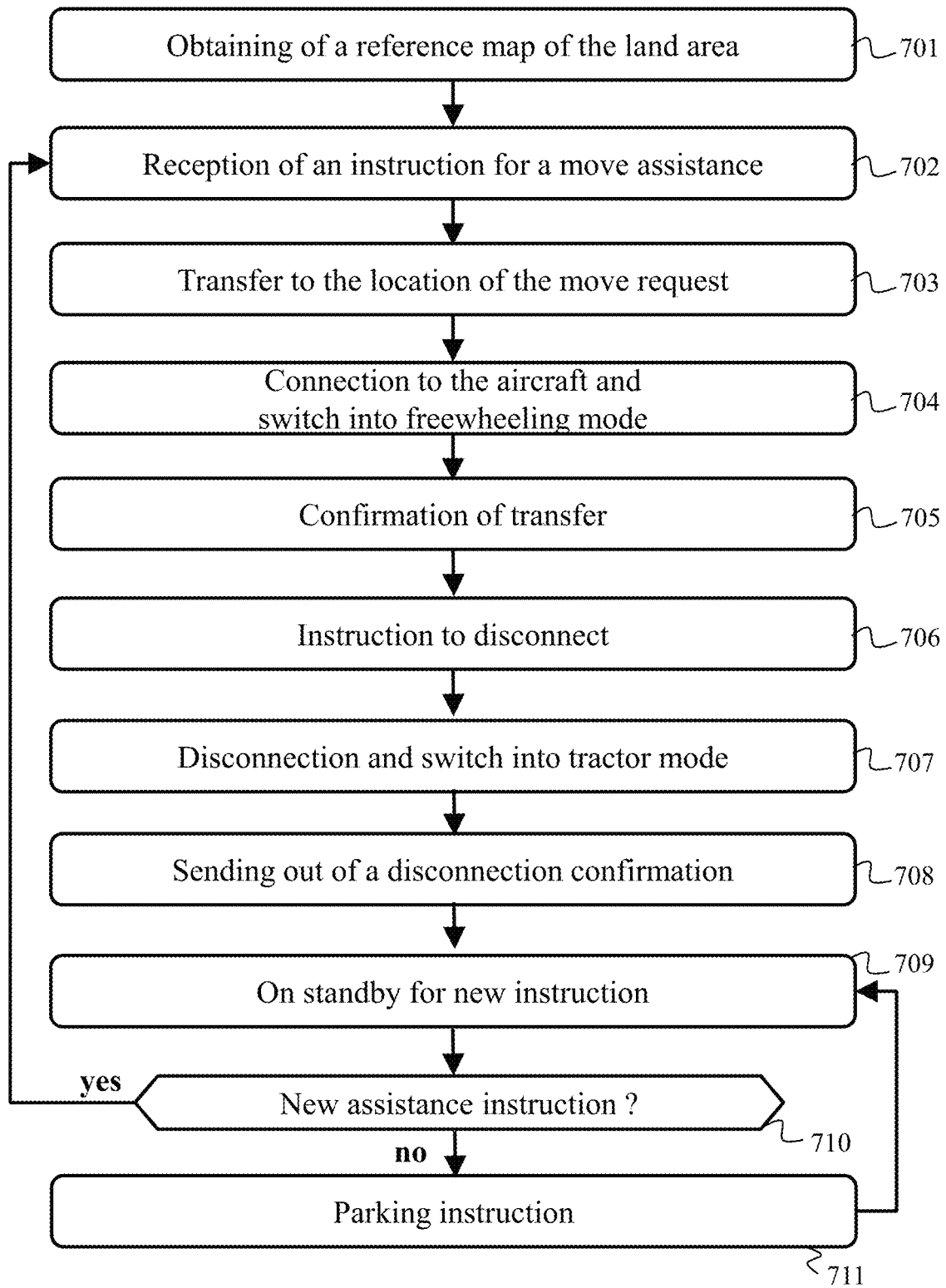
FIG. 7 illustrates schematically an algorithm, implemented by the assistance vehicle, for assisting the ground movement of at least one aircraft, according to one particular embodiment of the invention.

FIG. 7 illustrates schematically an algorithm, implemented by the assistance vehicle 100, for assisting the ground movement of at least one aircraft 200, according to one particular embodiment of the invention.

In an initialization step 701, the assistance vehicle 100 obtains the reference map of the land area 310, as already described.

In a step 702, the assistance vehicle 100 receives an assistance instruction ASSIST_INST, coming from the assistance station 300 via the wireless link 301, for providing an assistance to move an aircraft 200.

In a step 703, the assistance vehicle 100 automatically moves to the position of the aircraft 200 in question.

In a step 704, the assistance vehicle 100 automatically connects itself to the electric taxiing device of the aircraft 200 in question by virtue of the connector 140. The assistance vehicle 100 also switches into freewheeling mode.

In a step 705, the assistance vehicle 100 transmits a transfer confirmation TRANSF_CONF to the assistance station 300 indicating that the assistance vehicle 100 is mechanically and electrically connected to the aircraft 200. The assistance vehicle 100 is then able to supply the electric taxiing device of the aircraft 200 with electrical energy while following the ground movement of the aircraft 200.

In a step 706, when the aircraft 200 has been moved, the assistance vehicle 100 receives a disconnection instruction DISCONNECT_INST coming from the assistance station 300.

In a step 707, the assistance vehicle 100 disconnects itself from the aircraft 200 by separation of the connector 140 and from the landing gear 210 of the aircraft 200. The assistance vehicle 100 also comes out of freewheeling mode and goes back into tractor mode and into autonomous navigation.

In a step 708, the assistance vehicle 100 sends a confirmation of disconnection DISCONNECT_CONF to the assistance station 300 indicating that the assistance vehicle 100 is separated from the aircraft 200.

In a step 709, the assistance vehicle 100 goes into standby for a new instruction. In one particular embodiment, the assistance vehicle 100 further automatically detects a need for electrical recharging and, where necessary, automatically moves towards the recharging station 320 and connects itself to it. The assistance vehicle 100 informs the assistance station 300 of a recharging in progress. When the recharging has finished (or when a predefined threshold of charge has been exceeded), the assistance vehicle 100 informs the assistance station 300 of this, in order to indicate that it is again available to assist aircraft 200 in their ground movement requirements.

In a step 710, the assistance vehicle 100 identifies whether a new assistance instruction ASSIST_INST has been received. In the affirmative, the step 702 is repeated. In the opposite case, a step 711 is performed.

In the step 711, the assistance vehicle 100 receives a parking instruction coming from the assistance station 300. The parking instruction comprises a destination which may correspond to the position of the recharging station 320 or to a predefined parking place situated on the land area 310. When the execution of the parking instruction has been performed, the assistance vehicle 100 informs the assistance station 300 accordingly and the step 709 is repeated.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assistance vehicle configured to supply electrical energy to an electric taxiing device situated on a landing gear of an aircraft while the aircraft is moving over a ground surface, comprising:
   an autonomous source of energy,
   a connector enabling the assistance vehicle it to be mechanically and electrically connected to the electric taxiing device so as to be coupled to the aircraft and to electrically power the electric taxiing device by virtue of the autonomous source of energy,
   a first wireless communications interface, and
   a control mechanism, when an assistance instruction comprising the position of the aircraft is received via the first wireless communications interface, the control mechanism is configured to implement:
   means of autonomous navigation so as to reach a position of the aircraft,
   a collision-avoidance detector to detect and get around unexpected obstacles during move of the assistance vehicle,
when the assistance vehicle reaches the position of the aircraft, the control mechanism is configured to implement:
   means configured to automatically connect the connector to the electric taxiing device and means configured to switch into a freewheeling mode in order to be towed by the aircraft,
   means configured to transmit, via the first wireless communications interface, a transfer confirmation to indicate that the aircraft can move over the ground with the electric taxiing device powered by the assistance vehicle, and
when a disconnection instruction is received via the first wireless communications interface, the control mechanism is configured to implement:
   means configured to disconnect said connector to separate the connector from the electric taxiing device, and
   means configured to switch back into a tractor mode.

2. The assistance vehicle according to claim 1, further comprising an electrical connection device configured to connect to a connector of another assistance vehicle to couple to the aircraft at least two assistance vehicles connected in series.

3. A transfer system comprising the assistance vehicle according to claim 1, further comprising a drone configured to attach to the assistance vehicle enabling the assistance vehicle to be transported by air.

4. An aircraft equipped with an electric taxiing device on a landing gear, further comprising a connection device, situated on said landing gear or on the electric taxiing device and configured to connect the assistance vehicle according to claim 1 through the use of the connector of said assistance vehicle to electrically power the electric taxiing device.

5. An assistance system configured to meet a need for supplying an electric taxiing device equipping a landing gear of an aircraft with electrical energy while said aircraft is moving over a ground surface, the assistance system comprising:
   at least one assistance vehicle according to claim 1, and
   an assistance station equipped with a second wireless communications interface,
   when a request for moving the aircraft comprising a position of the aircraft coming from a terminal assumed to be on board the aircraft is received via the second wireless communications interface, the assistance station is configured to implement:
     means configured to identify at least one available assistance vehicle,
     means configured to transmit to at least one available assistance vehicle an assistance instruction comprising the position of the aircraft, and
   when a transfer confirmation coming from each assistance vehicle concerned is received via the second wireless communications interface, the assistance station is configured to implement:
     means configured to transmit a move authorization to said terminal, and
   when a move confirmation coming from said terminal is received via the second wireless communications interface, the assistance station is configured to implement:
     means configured to transmit a disconnection instruction to each assistance vehicle concerned.

6. The assistance system according to claim 5, further comprising a computer program product designed to be installed on said terminal and comprising instructions configured to cause implementation by a processor of said terminal of the following steps:
   upon detection of an order for assisted move of the aircraft via a user interface of said terminal, transmit to the assistance station the move request which comprises information on a global positioning of said terminal;
   receive a move authorization coming from the assistance station and indicate via the user interface that the assisted moving of the aircraft is ready; and
   upon detection of an indication of an end of assisted moving of the aircraft via the user interface of said terminal, transmit to the assistance station the move confirmation.

7. An airport equipped with the assistance system according to claim 5.

8. An assistance method implemented by an assistance vehicle for supplying electrical energy to an electric taxiing device situated on a landing gear of an aircraft while said aircraft is moving over a ground surface, wherein the assistance vehicle comprises:
   an autonomous source of energy,
   a connector enabling the assistance vehicle to be mechanically and electrically connected to the electric taxiing device so as to be coupled to the aircraft and, by virtue of the autonomous source of energy, to electrically power the electric taxiing device,
   a first wireless communications interface, and
   a control mechanism,
   when an assistance instruction is received via the first wireless communications interface comprising the position of the aircraft, the control mechanism performs the following steps:
     implementing an autonomous navigation so as to reach a position of the aircraft,
     through the use of a collision-avoidance detector, detecting and getting around unexpected obstacles during move of the assistance vehicle,
     when the assistance vehicle reaches the position of the aircraft, automatically connecting the connector to the electric taxiing device and switching into a freewheeling mode in order to be towed by the aircraft, then
     transmitting, via the first wireless communications interface, a transfer confirmation in order to indicate that the aircraft can move over the ground surface with the electric taxiing device powered by the assistance vehicle,
   when a disconnection instruction is received via the first wireless communications interface,
     disconnecting said connector in order to separate the assistance vehicle from the electric taxiing device and switch back into a tractor mode.

9. A management method implemented by an assistance system in order to meet a need for supplying electrical energy to an electric taxiing device of an aircraft while said aircraft is moving over a ground surface, wherein the assistance system comprises:

at least one assistance vehicle which implements a method according to claim 8, an assistance station being equipped with a second wireless communications interface, the assistance station performs the following steps:
- when a move request coming from a terminal assumed to be on board the aircraft and comprising the position of the aircraft is received via the second wireless communications interface:
  - identifying at least one available assistance vehicle,
  - transmitting an assistance instruction comprising a position of the aircraft to at least one assistance vehicle,
- when a transfer confirmation coming from each concerned assistance vehicle is received via the second wireless communications interface:
  - transmitting a move authorization to the aircraft, and
- when a move confirmation coming from said terminal is received via the second wireless communications interface:
  - transmitting a disconnection instruction to each concerned assistance vehicle.

\* \* \* \* \*